Figure 1:
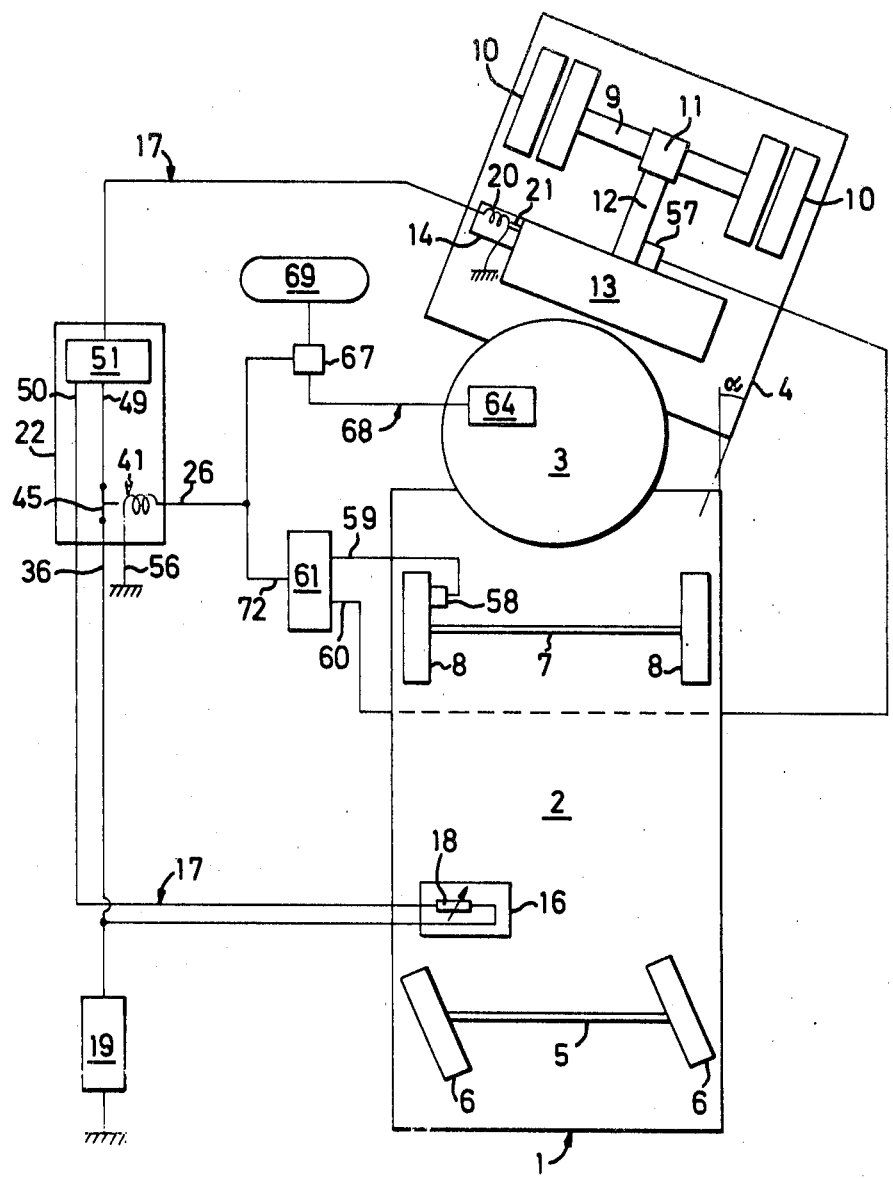

United States Patent [19]

Bergman et al.

[11] 4,412,592

[45] Nov. 1, 1983

[54] ARRANGEMENT FOR LIMITING UNCONTROLLED ARTICULATION MOVEMENTS AT A PIVOT BETWEEN VEHICLE UNITS

[75] Inventors: Hans I. Bergman; Björn D. Nyman, both of Katrineholm, Sweden

[73] Assignee: Saab-Scania Aktiebolag, Sodertalje, Sweden

[21] Appl. No.: 279,012

[22] Filed: Jun. 30, 1981

[30] Foreign Application Priority Data

Jul. 3, 1980 [SE] Sweden .............................. 8004927

[51] Int. Cl.³ .............................................. B62D 53/00
[52] U.S. Cl. .............................. 180/14 A; 180/197;
188/3 H; 280/432; 303/93
[58] Field of Search ................... 280/432, 446 B, 403;
180/197, 14 A; 303/93; 188/3 R, 3 H

[56] References Cited

U.S. PATENT DOCUMENTS

| | | | |
|---|---|---|---|
| 3,263,767 | 8/1966 | Rockwell | 180/14 A |
| 3,584,698 | 6/1971 | Larson et al. | 180/14 A |
| 3,776,357 | 12/1973 | Arai | 180/197 |
| 3,938,611 | 2/1976 | Bertolasi | 180/197 X |
| 4,320,811 | 3/1982 | Queveau | 280/432 |

FOREIGN PATENT DOCUMENTS

| | | |
|---|---|---|
| 15176 | 9/1980 | European Pat. Off. . |
| 2148302 | 4/1973 | Fed. Rep. of Germany . |
| 1280879 | 7/1952 | United Kingdom . |
| 925206 | 5/1963 | United Kingdom . |
| 1243005 | 8/1971 | United Kingdom . |

*Primary Examiner*—John A. Pekar
*Attorney, Agent, or Firm*—Cushman, Darby & Cushman

[57] ABSTRACT

An arrangement in articulated vehicles for avoiding uncontrolled articulation movements between participating vehicle units. A transducer, sensing instantaneous speed of at least one driven vehicle wheel on the trailing vehicle unit, sends a signal in response thereto to a comparator circuit where the signal is compared with a reference signal representing a normal value for the wheel speed. If a predetermined speed difference is indicated, the comparator circuit activates means such as an operating power control means and/or an articulation brake, for limiting the articulation movement.

5 Claims, 2 Drawing Figures

ARRANGEMENT FOR LIMITING UNCONTROLLED ARTICULATION MOVEMENTS AT A PIVOT BETWEEN VEHICLE UNITS

The present invention relates to an arrangement in articulated vehicles, preferably articulated buses, for limiting during travel uncontrolled articulation movements between a leading vehicle unit and a trailing vehicle unit articulatedly connected thereto and equipped with driving wheels, which are driven by means of a driving unit.

In articulated vehicles, e.g. articulated buses, there is a risk during abnormal driving conditions that the participating vehicle units are subjected to uncontrolled articulation movements relative to each other. This can result in that the vehicle units can unchecked fold up towards a centre of curvature, so-called jack-knifing, or also out from said centre of curvature, the back end then yawing out. Such uncontrolled articulation movements can cause dangerous traffic situations, not in the least because the size of an articulated vehicle generally does not allow the possibility of any correction requiring space. The risk of uncontrolled articulation movements is particularly noticeable in articulated vehicles with the drive arranged on the most rearward vehicle axle, since the drive takes place as a thrusting movement.

A plurality of different forms of articulation locks have been developed with the intention of limiting the occurrence of uncontrolled articulation movement in articulated vehicles, such locks being intended for activation when critical situations occur. One of the most well-known arrangements in this respect is based on placing hydraulic cylinders between the vehicle units, usually one on either side of the longitudinal axis of the combination and a pivot plate or the like connecting the vehicle units. The respective ends of the hydraulic cylinders are attached to the vehicle units, and the cylinders communicate with each other via a connection means. Hydraulic oil flows through said means to and from the respective cylinders in response to the angular attitude of the vehicle units. This angle, i.e. the angle between the central axes of the vehicle units, will hereinafter be referred to as the articulation angle. A blocking means is activated in the case where the articulation angle changes abnormally rapidly; this means completely or partially blocking flow in the connection means and thereby preventing further change in the articulation angle.

Sensing the rate of change of the articulation angle by means of sensing the speed of the hydraulic oil flow involves difficulties in selecting a suitable critical limiting value for when activation of the blocking means shall take plate. During normal driving conditions, also including driving through curves at both low and high speed, the system must not be too sensitive, but at the same time it must be sufficiently sensitive for rapidly reacting to abnormal articulation. In certain cases, such uncontrolled articulation movement can also take place relatively slowly. These conflicting conditions have resulted in that known practical forms of articulation blocking systems are often pre-programmed with limiting values which are compromises for when the articulation blocking system shall be activated. The result of this is that in certain driving conditions such an articulation blocking system is activated when it should not be, and vice versa.

Another principle solution is based on arranging means sensing the articulation angle between the vehicle units and means sensing the vehicle steering angle. Signals corresponding to these quantities are compared, and in the cases where the articulation angle is greater than is justified by the appropriate steering angle, blocking means are activated to prevent continued articulation.

This system as well has certain drawbacks, however. At the exit from a sharp turn or during a turn at a street crossing, the steering angle will decrease more rapidly than the articulation angle. This results in that the articulation blocking means will be activated in the intended manner and prevent continued increase of the articulation angle. In such conditions, it is usual that the driver begins to accelerate the vehicle as soon as the leading vehicle unit has passed the curve or crossing, in spite of the articulation angle being relatively large in this situation. Where friction between the vehicle wheels and the ground is small, a situation of this kind can result in that the tendency of the trailing vehicle unit to go straight forwards causes the wheels on the rear axle of the leading vehicle unit to be subjected to gliding. The activated articulation blocking system will only prevent continued increase of the articulation angle in this case but will not prevent the trailing vehicle unit from executing an uncontrolled movement.

Under the same driving conditions, it is also probable that the driving rear wheels spin free and that the back end of the vehicle glides without control in the transverse direction.

Common to the above-mentioned known articulation blocking arrangements is that they are substantially designed solely to prevent increase in an articulation angle, while they do not block for a reduction of this angle.

The present invention has the object of solving the problem stated for articulated vehicles, preferably articulated buses with driving on the rear axle, in a manner avoiding the drawbacks of known solutions.

According to the invention, at least one conventional transducer is adapted for sensing the instantaneous speed of at least one vehicle wheel on the trailing vehicle unit for giving a signal corresponding to said speed to a comparator circuit in which the transducer signal is compared with a reference signal representing a normal value for the wheel speed at the instantaneous vehicle speed, and the comparator circuit is adapted to send an output signal to means limiting the articulation movement if the difference between the instantaneous wheel speed signal and the reference signal exceeds a predetermined value.

In an advantageous embodiment of the invention, the comparator circuit sends an output signal to at least one means controlling the transmitted power, said means apportioning transferable power to the driving wheels and/or to at least one regulating means associated with mechanical means directly influencing articulation movement, said mechanical means preferably constituting a pivoting brake known per se.

Figure 2:
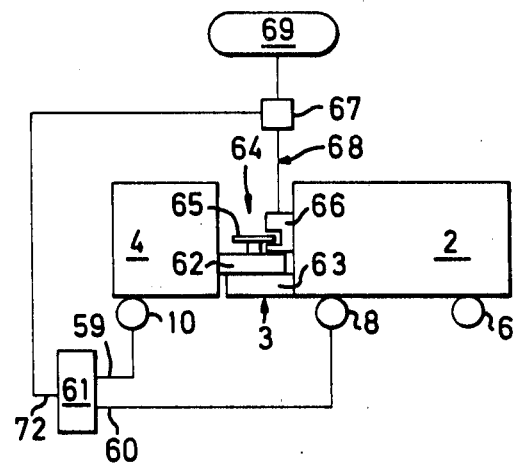

Other properties and advantages distinguishing the invention will be apparent from the following claims and from the examples described below. The description is made while referring to the appended drawings, on which FIG. 1 schematically illustrates a principle configuration of an articulated bus, and also shows a circuit diagram, and FIG. 2 illustrates a principle embodiment of an articulation lock.

An articulated bus 1 comprises a leading vehicle unit 2 and a trailing vehicle unit 4, these units being articulatedly connected to each other via a pivot 3. The leading vehicle unit 2 includes a forward axle 5 carrying steerable wheels 6 and an intermediate axle 7 carrying non-steerable, free-rolling wheels 8. The trailing vehicle unit 4 includes a rear axle 9 carrying driving wheels 10, which are conventionally connected to a driving unit 13 via a differential gear 11 and a cardan shaft 12 for power transmission. Said driving unit 13 includes an internal combustion engine to which there is fixed an automatically controlled gearbox with associated control and regulating means. The driving unit 13 is controlled by a power control means 14 which in turn is actuated by an accelerator pedal 16 arranged at the driver's seat in the leading vehicle unit 2. Translation of the accelerator pedal 16 movement to the power control means 14, which in practice constitutes a fuel injection pump, is done electrically via a wire 17. On actuation of the pedal 16, a variable electric resistor 18 is actuated, and this is connected to a DC source 19, according to FIG. 1.

At the power control means 14 the wire 17 is connected to a solenoid 20, disposed for coaction with a spring-biased armature 21 on a regulating rod (not shown) on the engine injection pump. In response to the voltage applied to the solenoid 20, the armature 21 and thereby the injection pump-regulating rod, will assume different positions, corresponding to different power delivery from the driving unit 13.

A control means 22 comprising a comparator circuit 51 provided with two inputs is connected between the resistor 18 and the power transmission control means 14. To one input 50 is connected the wire 17 from the variable resistor 18 at the accelerator pedal 16, and the other input 49 is connected to the DC source 19 via a wire including a switch 45. Said switch 45 is regulated by a relay 41 the solenoid of which is arranged at an input 26 of the control means 22 and connected to earth via a wire 56. The comparator 51 compares voltage applied on the two inputs 49,50 and passes the lowest voltage to the means 14 controlling power transmission.

Sensing the speed of the bus 1 is done by sensing the r.p.m. of the driving shaft of the driving unit 13. This shaft is connected with the cardan shaft 12, and via a spur gear (not shown) it is also connected to a speed transducer 57 in the form of an electric AC generator the output signal frequency of which is a measure of the r.p.m. By suitable signal processing, this signal is converted for representing the speed of the bus 1. The signal also constitutes a parameter which expresses the mean speed of the driving wheels 10.

In the inventive arrangement, one of the wheels of the intermediate shaft 7 is provided with a speed transducer 58, which gives voltage pulses with a frequency corresponding to the speed. Such speed transducers 58 for vehicle wheels are well-known within the art in conjunction with so-called skid-free brakes. The transducer 58 is connected to an input 59 on a comparator 61, which is also provided with a second input 60 connected to the previously described speed transducer 57. The output 72 of the comparator 61 is connected to the input 26 on the control means 22.

As will be seen from FIG. 2, the pivot 3 comprises two pivot plates 62,63, one being an upper plate 62 rigidly connected to the trailing vehicle unit 4 and the other a lower plate 63 rigidly connected to the leading vehicle unit 2. These plates 62,63 are in mutual gliding relationship, and in a horizontal direction they are fixed to each other via a central vertical shaft (not shown) about which the plates 62,63 can turn relative each other, and thus the units 2,4 as well.

The described arrangement has the following function. When driving with the same speed on the driven as well as undriven wheels, the comparator 61 does not send any output signal, which signifies that the relay 41 is not energized. This also signifies that the voltage applied to the comparator 51 on the input 50 from the accelerator pedal 16 will be lower than the voltage applied to the input 49 from the DC source 19. Where the resistance of the variable resistor 18 is presumed to be equal to zero for a full-throttle position of the accelerator pedal 16, the voltage will be equal on the two inputs 49,50 to the comparator 51. This signifies that the position of the accelerator pedal 16 controls what voltage is fed out from the control means 22 for controlling the transmittable power of the driving unit 13.

A signal corresponding to the average speed of the driven wheels 10 is thus compared in the comparator 61 with a signal corresponding to the speed of a non-driven wheel 8. If these speeds have a discrepancy of more than 10%, this is an indication that one of the wheels 8,10 is spinning and/or gliding. In such a situation the comparator 61 sends an output signal activating the relay 41 in the control means 22, whereby the switch 45 in the wire between the DC source 19 and the comparator circuit 51 is opened. The driving unit 13 is thereby caused to reduce its r.p.m. to idling until the current operating condition has been altered. The comparator 61 is adapted so as not to react for the minor differences in speed which can occur in normal curve-taking or the like.

By means of this arrangement, the maximum operating power transmittable by the driving unit will be limited by a speed difference between a driven and an undriven vehicle wheel.

In a modified embodiment, the signal from the comparator 61 can be used to control an articulation brake known per se. This brake can be of the kind prevalent in the art for preventing a trailing vehicle jack-knifing on a prime mover during braking. Such an articulation brake 64, which is principally illustrated in FIG. 2, comprises a brake disc 65 rigidly attached to the upper pivot plate 62, and a brake caliper 66 embracing the disc 65 and being rigidly attached to the lower pivot plate 63 and the leading vehicle unit 2. The brake calliper 66 includes compressed air-operated braking pads (not shown) and is connected to a compressed-air source 69 via a conduit 68. In the conduit 68 there is a solenoid valve 67 connected to the output 72 of the comparator 61. When the comparator 61 senses a wheel spin condition, said comparator 61 gives an output signal activating the solenoid valve 67. Said valve opens compressed-air communication with the compressed-air source 69, and air flows to the brake calliper 66 via the conduit 68. The braking pads are brought into engagement with the brake disc 65, movement between the two pivot plates 62,63 and the two vehicle units 2,4 thus being braked and/or locked.

A wheel-slip sensing articulation brake formed in accordance with the invention can be utilized to advantage in a separate control system, but by combining an articulation braking function with the previously described operating power reduction, considerable advantages are gained. When wheel spin is indicated, the operating power will be reduced, and thereby the risk of the trailing vehicle 4 gliding uncontrollably in the transverse direction is also reduced. Reducing the operating power furthermore results in that the wheel spin can cease earlier than would otherwise be the case.

The invention can also be combined to advantage with a so-called automatic brake control system. Such a system usually includes wheel speed transducers and electronic units which can be utilized per se for detecting driving wheel spin.

The inventive arrangement can consequently be modified into different embodiments. In this respect, the control means 22 can be formed to advantage as an electronic control system according to known semiconductor technology and/or with the aid of integrated circuits. In such applications it is often more simple to utilize signals in the form of zero voltages, i.e. a signal is assumed sent when a connection is earthed. Furthermore, the power control means 14 can comprise a DC engine instead of a solenoid 20 with an armature 21, the output torque of the engine being proportional to the voltage applied to it. This engine can then be caused to actuate a fuel-injection pump with the aid of a suitable mechanism.

What we claim is:

1. An arrangement in articulated vehicles for limiting uncontrolled articulation movements between a leading vehicle unit and a trailing vehicle unit articulatedly connected thereto and equipped with driving wheels which are driven by means of a driving unit, characterized in that at least one transducer is adapted to sense instantaneous speed of at least one driving wheel on the trailing vehicle unit and to send a signal corresponding to said speed to a comparator circuit where the transducer signal is compared with a reference signal representing a normal value for the wheel speed at the instantaneous vehicle speed, and that another transducer is adapted to sense instantaneous speed on at least one free-rolling vehicle wheel on the leading vehicle unit and to send a signal corresponding thereto to the comparator circuit for constituting the reference signal, the comparator circuit being adapted to give, if the difference between the instantaneous wheel speed signal and the reference signal exceeds a predetermined value, an outlet signal to at least one power control means for the driving unit which apportions transmittable force to the driving wheels in response to said signal, and/or to at least one regulating means regulating mechanical means directly affecting the articulation movement in response to said signal.

2. An arrangement as claimed in claim 1, characterized in that the power control means controls the fuel supply to an internal combustion engine incorporated in the driving unit.

3. An arrangement as claimed in claim 1, characterized in that the regulating means comprises a solenoid valve in a connection between a compressed-air source and the mechanical means.

4. An arrangement as claimed in claim 3, characterized in that the mechanical means limiting the articulation movement comprises an articulation brake.

5. An arrangement as claimed in claim 1, characterized in that the signal applied to the operating power control means from the comparator circuit limits the transmittable operating power of the driving unit to a value corresponding to idling.

* * * * *